United States Patent
Ingle et al.

(10) Patent No.: US 8,429,378 B2
(45) Date of Patent: Apr. 23, 2013

(54) SYSTEM AND METHOD TO MANAGE A TRANSLATION LOOKASIDE BUFFER

(75) Inventors: Ajay Anant Ingle, Austin, TX (US); Erich James Plondke, Austin, TX (US); Muhammad T. Rab, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 12/830,494

(22) Filed: Jul. 6, 2010

(65) Prior Publication Data

US 2012/0011342 A1  Jan. 12, 2012

(51) Int. Cl.
*G06F 12/00* (2006.01)

(52) U.S. Cl.
USPC ..... 711/208; 711/205; 711/206; 711/E12.061

(58) Field of Classification Search .......... None
See application file for complete search history.

(56) References Cited

U.S. PATENT DOCUMENTS

| | | | |
|---|---|---|---|
| 5,860,147 A | 1/1999 | Gochman et al. | |
| 6,408,373 B2 | 6/2002 | Burger et al. | |
| 6,591,344 B2 | 7/2003 | Kyker et al. | |
| 6,957,315 B2 | 10/2005 | Chauvel | |
| 2002/0062425 A1* | 5/2002 | Chauvel | 711/130 |
| 2006/0026381 A1* | 2/2006 | Doi et al. | 711/207 |
| 2007/0094660 A1 | 4/2007 | Codrescu | |
| 2008/0065865 A1 | 3/2008 | Kim et al. | |

FOREIGN PATENT DOCUMENTS

EP   1182571 A2   2/2002

OTHER PUBLICATIONS

International Search Report and Written Opinion—PCT/US2011/042942—ISA/EPO—Nov. 11, 2011.

* cited by examiner

*Primary Examiner* — Yaima Campos
*Assistant Examiner* — Thanh D Vo
(74) *Attorney, Agent, or Firm* — Peter M. Kamarchik; Nicholas J. Pauley; Jonathan T. Velasco (57) ABSTRACT

A system and method to manage a translation lookaside buffer (TLB) is disclosed. In a particular embodiment, a method of managing a first TLB includes in response to starting execution of a memory instruction, setting a first field associated with an entry of the first TLB to indicate use of the entry. The method also includes setting a second field to indicate that the entry in the first TLB matches a corresponding entry in a second TLB.

29 Claims, 6 Drawing Sheets

SYSTEM AND METHOD TO MANAGE A TRANSLATION LOOKASIDE BUFFER

I. FIELD

The present disclosure is generally related to managing a translation lookaside buffer.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Data storage capacities of a computing device may be enhanced through the use of a memory management unit (MMU) that includes a translation lookaside buffer (TLB). The TLB may help the computing device perform translations quickly by storing entries that map a virtual address to a corresponding physical address within a memory (e.g., random access memory (RAM)). In a multi-threaded environment where multiple threads share the TLB (e.g., a joint TLB), multiple threads may update or remove an entry within the joint TLB.

A micro-TLB may store copies of entries from the joint TLB and the copies stored at the micro-TLB may only be modified by a particular thread. For example, a joint TLB entry may be modified by multiple threads and a micro-TLB may be modified by only a particular thread. After a translation entry has been copied from the joint TLB into a micro-TLB by a first thread, a second thread may update or remove the corresponding entry in the joint TLB. In this case, the micro-TLB entry may not match the corresponding joint TLB entry.

III. SUMMARY

A micro-TLB is described that synchronizes a micro-TLB entry to match a corresponding entry in a joint TLB. The micro-TLB includes a first field and a second field. The first field indicates whether a particular thread is using the micro-TLB entry during execution of an instruction and the second field indicates whether the micro-TLB entry matches the corresponding entry in the joint TLB. During execution of the instruction, the second field may be cleared to indicate that the joint TLB entry has been changed and that the micro-TLB entry no longer matches the joint TLB entry. However, when the entry in the micro-TLB is in use, the first field may be set to prevent the micro-TLB entry from being immediately synchronized to match the updated joint TLB entry. After the instruction has completed execution, the first field may be cleared to indicate that the micro-TLB entry is no longer in use, enabling the micro-TLB to then synchronize the micro-TLB entry to match the corresponding joint TLB entry.

In a particular embodiment, a method of managing a first translation lookaside buffer (TLB) is disclosed. The method includes, in response to starting execution of a memory instruction, setting a first field associated with an entry of the first TLB to indicate use of the entry and setting a second field to indicate that the entry in the first TLB matches a corresponding entry in a second TLB. The first TLB may be a micro-TLB and the second TLB may be a shared TLB.

In a particular embodiment, an apparatus includes a first translation lookaside buffer (TLB). The first TLB includes a TLB entry and includes a first field and a second field corresponding to the TLB entry. The first field indicates whether the TLB entry is in use and the second field indicates whether the TLB entry matches a corresponding entry in a second TLB.

One particular advantage provided by at least one of the disclosed embodiments is an ability of a processor to execute an instruction based on a translation entry in a micro-TLB without the micro-TLB entry being changed before the instruction has completed execution. Because the micro-TLB entry remains unchanged during the execution of the instruction, the processor may complete the execution of the instruction without receiving a miss when accessing the TLB entry in the micro-TLB. The processor may therefore receive and process a very long instruction word (VLIW) packet that includes multiple instructions with a requirement that execution of all of the multiple instructions be completed without receiving a missed TLB entry error after the first field (use bit) has been set for all the instructions in the VLIW packet that require a translation.

Another particular advantage provided by at least one of the disclosed embodiments is that when a memory instruction requires another output of the translation (e.g., during a replay of the memory instruction), the micro-TLB may output the translation without performing a new comparison of an address of the memory instruction to the translation entries of the micro-TLB. In this case, the micro-TLB may reduce power consumption by skipping a comparison during the translation of the memory instruction.

Other aspects, advantages, and features of the present disclosure will become apparent after review of the entire application, including the following sections: Brief Description of the Drawings, Detailed Description, and the Claims.

V. DETAILED DESCRIPTION

Figure 1:
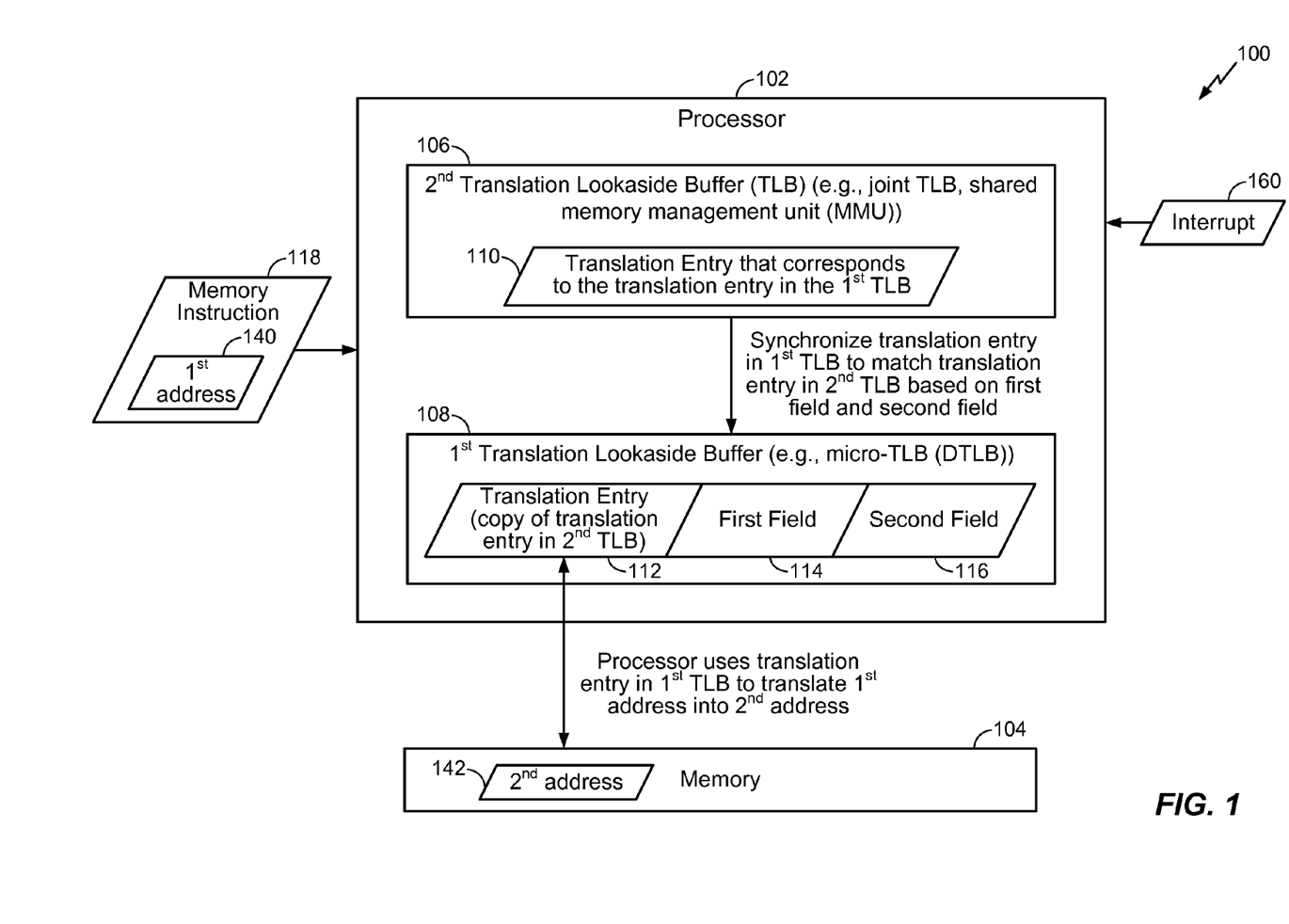
FIG. 1 is a block diagram of a particular illustrative embodiment of a system that synchronizes translation lookaside buffers.

Referring to FIG. 1, a system 100 that synchronizes translation lookaside buffers is shown. The system 100 includes a processor 102 that includes a first translation lookaside buffer (TLB) 108 and a second TLB 106. The second TLB 106 may be a joint TLB that includes entries that are shared by multiple threads of the processor 102. The first TLB 108 may be a micro-TLB that includes entries copied from the second TLB 106 for the exclusive use of a particular thread. For example, the processor 102 may include a micro-TLB for each thread. The processor 102 may synchronize a translation entry 112 in the first TLB 108 to match a corresponding translation entry 110 in the second TLB 106. The first TLB 108 includes a first field 114 that indicates whether the translation entry 112 is being used and a second field 116 that indicates whether the translation entry 112 matches the corresponding translation entry 110 in the second TLB 106.

The processor 102 may be configured to receive and translate a first address 140 into a second address 142 of a memory 104. For example, the first address 140 may be a virtual page number (VPN), and the second address 142 may be a physical page number (PPN). Information used to perform the translation may be stored as a translation entry (e.g., the translation entry 110) in a joint TLB (e.g., the second TLB 106). For example, the translation entry 110 may map a particular VPN to a corresponding PPN. The processor 102 may be configured to determine whether a micro-TLB (e.g., the first TLB 108) includes a copy of the translation entry 110. Based on the determination, the processor 102 may synchronize the translation entry 112 of the first TLB 108 to match the translation entry 110 of the second TLB 106. The processor 102 may be configured to use the translation entry 112 of the first TLB 108 to perform the translation of the first address 140 into the second address 142. For example, when a particular thread is executing the memory instruction 118, the processor 102 may use a micro-TLB (e.g., the first TLB 108) that corresponds to the particular thread to perform the translation.

The processor 102 may be configured to keep track of whether the translation entry 112 in the first TLB 108 is in use. The translation entry 112 may be in use when the processor 102 has used the translation entry 112 to perform a translation of the first address 140 and has started execution of the memory instruction 118 but has not completed execution of the memory instruction 118. In this case, the first field 114 of the first TLB 108 may be set by the processor 102 to indicate that a particular thread of the processor 102 is using the translation entry 112. When the memory instruction 118 has completed execution, the processor 102 may clear the first field 114 to indicate that the translation entry 112 in the first TLB 108 is no longer in use. In addition, the first field 114 may be cleared when execution of the memory instruction 118 has been aborted or the processor 102 receives an interrupt 160 during the execution of the memory instruction 118.

The processor 102 may also be configured to prevent the translation entry 112 in the first TLB 108 from being allocated to another memory instruction until the execution of the memory instruction 118 is complete. For example, when the first field 114 is set, the processor 102 may prevent the translation entry 112 from being dedicated to another memory instruction. In this case, when the processor 102 receives a replacement request for the translation entry 112 while the first field 114 is set, the processor 102 re-routes the replacement request to a second entry (not shown) in the first TLB 108. The second entry may have a corresponding first field that is not set. Thus, once the translation entry 112 is allocated to a particular memory instruction (e.g., the memory instruction 118), the translation entry 112 may be prevented from being changed until the memory instruction 118 completes execution.

The processor 102 may be configured to update or remove the translation entry 110 in the second TLB 106 while the memory instruction 118 is executing. For example, a first thread of the processor 102 may update the translation entry 110 in the second TLB 106 while a second thread of the processor 102 is using the first TLB translation entry 112 during the execution of the memory instruction 118. In this case, the translation entry 112 in the first TLB 108 would not match the corresponding translation entry 110 in the second TLB 106 (i.e., after the translation entry 110 is updated). The processor 102 may be configured to keep track of whether the translation entry 112 matches the corresponding entry 110 in the second TLB 106. For example, when the translation entry 110 is copied from the second TLB 106 into the translation entry 112 of the first TLB 108, the processor 102 may set the second field 116 to indicate that the two translation entries 110, 112 match. When the corresponding translation entry 110 is updated, removed, or otherwise changed, the processor 102 may clear the second field 116 to indicate that the two entries 110, 112 do not match.

The processor 102 may be configured to synchronize the translation entry 112 in the first TLB 108 to match the translation entry 110 in the second TLB 106 based on the first field 114 and the second field 116 of the first TLB 108. For example, when the first field 114 indicates that the translation entry 112 in the first TLB 108 is in use by a particular thread that is executing an instruction (e.g., the memory instruction 118), the processor 102 may be configured to prevent the translation entry 112 from being changed regardless of whether the second field 116 indicates that the entries 110, 112 do not match. As another example, when the first field 114 indicates that the translation entry 112 in the first TLB 108 is not in use, the processor 102 may be configured to synchronize the translation entry 112 with the corresponding translation entry 110 in the second TLB 106, based on whether the second field 116 indicates that the entries 110, 112 do not match.

By synchronizing a particular entry within the first TLB 108 based on the first field 114 and the second field 116, the processor 102 performs synchronizations of a translation entry (e.g., the translation entry 112) in the first TLB 108 after use of the translation entry is complete. Because the first TLB entry 112 is updated after the memory instruction 118 has completed execution, the first TLB entry 112 remains in the first TLB 108 throughout execution of the memory instruction 118. Thus, a particular thread of the processor 102 that is using the first TLB translation entry 112 does not receive a TLB miss error during an execution of the memory instruction 118. Preventing a TLB miss error may improve the performance of the processor 102 and the memory 104

Figure 2:
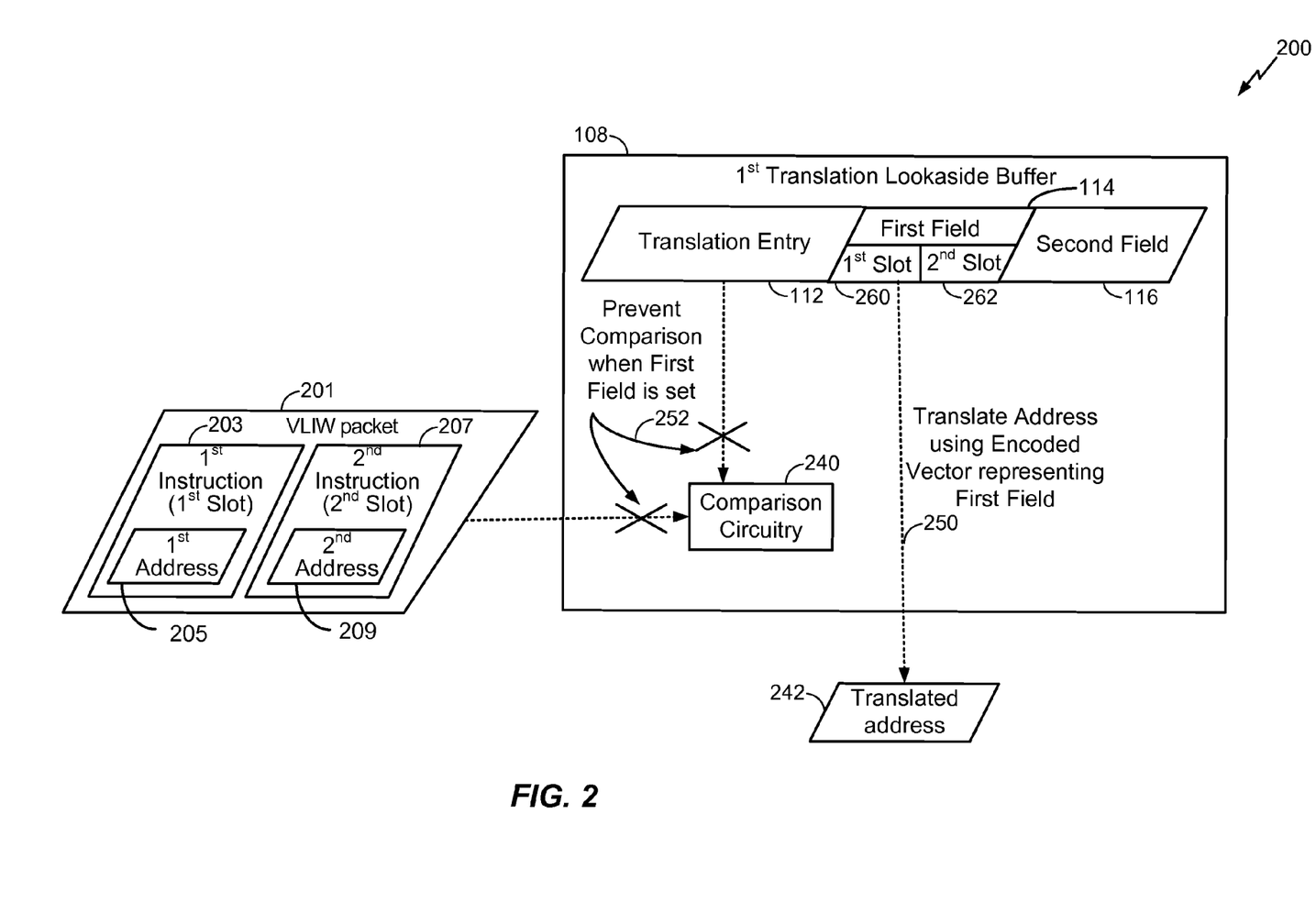
FIG. 2 is a diagram of a particular illustrative embodiment of the first translation lookaside buffer of FIG. 1 that performs a translation of an address based on a first field and a second field.

Referring to FIG. 2, a particular embodiment of a system 200 that includes the first translation lookaside buffer (TLB) 108 of FIG. 1 is shown. The first TLB 108 may include comparison circuitry 240 that is configured to determine if one or more addresses match a translation entry (e.g., the translation entry 112) within the first TLB 108. For example, the first TLB 108 may be configured to translate multiple addresses from a very long instruction word (VLIW) packet 201. In this case, an entry of the first TLB 108 may correspond to multiple instructions in the VLIW packet 201, such as a first instruction 203 in a first "slot" of the VLIW packet 201 and a second instruction 207 in a second "slot" of the VLIW packet 201. The first instruction 203 may have a first address 205 and the second instruction 207 may have a second address 209. For example, the first instruction 203 may be an instruction to load data stored at the first address 205.

In response to a determination by the comparison circuitry 240 that at least one of the addresses (e.g., the first address 205 or the second address 209) matches the translation entry 112, the first TLB 108 may use the translation entry 112 to generate a translated address 242. In this case, the first field 114 may be set to indicate that the translation entry 112 is in use by a particular instruction. For example, a first slot 260 of the first field 114 may indicate whether the translation entry 112 is in use by the first instruction 203 and a second slot 262 of the first field 114 may indicate whether the translation entry 112 is in use by the second instruction 207 of the VLIW packet 201. When one of the first slot 260 and the second slot 262 indicates that the translation entry 112 is in use, the translation entry 112 may remain unchanged in the first TLB 108 until the first instruction 203, the second instruction 207, or both have completed execution. For example, if at least one of the slots of the first field 114 indicates that the translation entry 112 is in use, the translation entry 112 may not be updated (e.g., synchronized with another translation lookaside buffer).

Figure 3:
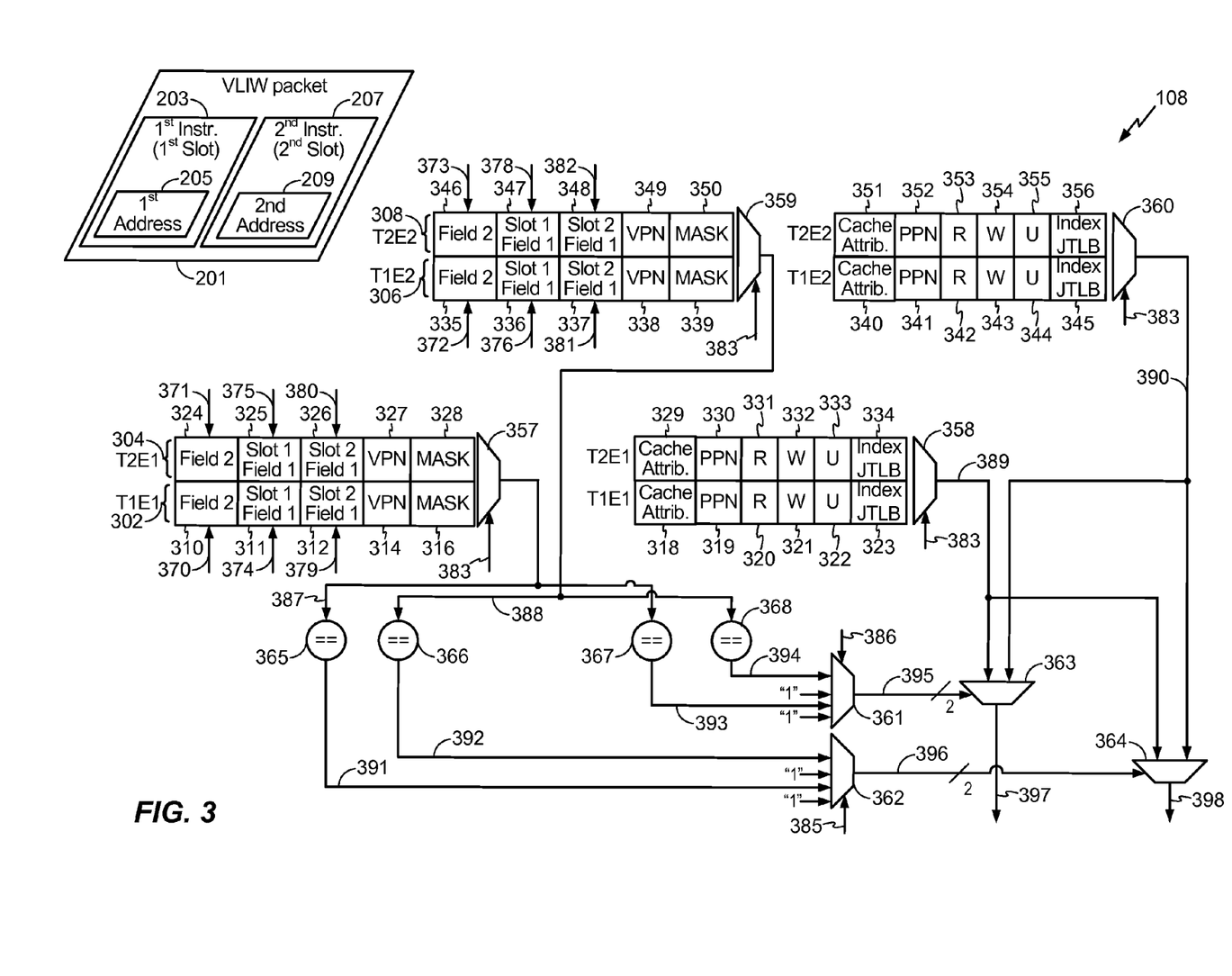
FIG. 3 is a diagram of a second illustrative embodiment of the first translation lookaside buffer of FIG. 1 that performs a translation of an address based on a first field and a second field.

The translation entry 112 may continue to be 'in use' for example, when a particular instruction does not complete execution and is consequently replayed. In this case, the determination of whether the address associated with the instruction matches a translation entry in the first TLB 108 may be bypassed. For example, when the first slot 260 of the first field 114 is set to indicate that the translation entry 112 is in use, the comparison circuitry 240 may be prevented 252 from comparing the first address 205 to the translation entry 112. In this case, the first TLB 108 may use an encoded vector 250 that represents the first slot 260 of the first field 114 to translate the first address 205 into the translated address 242. By bypassing the comparison of the first address 205 to an entry in the first TLB 108 and relying instead upon vectors representing the first field 114, translations of addresses by the first TLB 108 may be performed faster and with less power consumption. FIG. 3 includes a particular embodiment of the comparison circuitry 240 and further explains conditions in which the comparison circuitry 240 may determine or be prevented from determining if a memory address matches an entry within the first TLB 108.

Referring to FIG. 3, a particular embodiment of the first translation lookaside buffer (TLB) 108 that performs a translation of an address based on a first field and a second field is shown. The first TLB 108 may include entries that correspond to multiple threads. For example, the first TLB 108 includes a first entry 302 and a second entry 306 that are associated with a first thread and a first entry 304 and a second entry 308 that are associated with a second thread. Each entry 302, 304, 306, 308 may include a second field, a plurality of first fields, and other information that is used to translate a memory address.

The first TLB 108 includes circuitry that performs a translation of a memory address based on the translation entry. For example, the first TLB 108 includes a first multiplexer 357 and a third multiplexer 359 that are configured to output a virtual page number (VPN, Mask, Field 1, Field 2) of an entry within the first TLB 108. The first TLB 108 also includes comparison circuitry (e.g., the comparison circuitry 240 of FIG. 2). In a particular embodiment, the comparison circuitry may include a first comparator 365, a second comparator 366, a third comparator 367, and a fourth comparator 368. The comparators 365-368 may be configured to compare the VPNs of entries in the first TLB 108 to an address of the very long instruction word (VLIW) packet 201. The first TLB 108 further includes a second multiplexer 358, a fourth multiplexer 360, a fifth multiplexer 361, a sixth multiplexer 362, a seventh multiplexer 363, and an eighth multiplexer 364 that are configured to select and output a physical page number (PPN, R, W, U, Cache Attribute) when a particular address of the VLIW packet 201 matches a VPN of an entry of the first TLB 108.

As discussed in FIG. 2, an entry of the first TLB 108 may correspond to multiple instructions in the VLIW packet 201, such as the first instruction 203 in a first "slot" of the VLIW packet 201 and the second instruction 207 in a second "slot" of the VLIW packet 201. A first field of a first slot of an entry (i.e., "Slot 1 Field 1") may indicate whether a particular entry is in use by the first memory instruction 203, and a first field of a second slot of the particular entry (i.e., "Slot 2 Field 1") may indicate where the entry is in use by the second memory instruction 207 of the VLIW packet 201.

Each entry of the first TLB 108 may also include a second field (e.g., the second field 116 of FIG. 1). The second field may indicate whether a particular entry matches a corresponding entry in another TLB. For example, the entries of the first TLB 108 may correspond to entries of a joint TLB (e.g., the second TLB 106 of FIG. 1). In this case, when a particular entry of a joint TLB is updated or removed, the second field may be either set or cleared to indicate whether the corresponding entry in the first TLB 108 matches the corresponding entry in a joint TLB. For example, when the second field for a particular entry is set, the entry in the first TLB 108 may match the corresponding joint TLB entry. Alternatively, when the second field for the particular entry is cleared, the joint TLB entry may have changed and therefore does not match the entry in the first TLB 108. In response to determining that the second field is clear, a processor (e.g., the processor 102 of FIG. 1) may selectively synchronize the particular entry in the first TLB 108 to match the corresponding joint TLB entry.

Each entry of the first TLB 108 may include a virtual page number (VPN), a mask, a cacheability attribute, a physical page number (PPN), and one or more permissions. The VPN may be an address that is used by a memory instruction in a program. The mask may be used with a VPN to determine a PPN in memory corresponding to the VPN. The cacheability attribute may indicate whether a particular entry may be cached. The permissions may include a read permission indicator, a write permission indicator, and a user permission indicator, which indicate respectively whether a particular entry may be used to read or write and whether a particular user associated with the entry has permission to use the entry. The entry in the TLB may also include an index number of a second TLB. The index number may indicate a corresponding entry in another TLB, such as the second TLB 106 of FIG. 1. In this case, when the corresponding entry in the second TLB 106 is updated, the index number of the corresponding entry may be used to identify entries in the first TLB 108 for synchronization.

The first entry 302 of the first thread may include transformation information, such as a second field 310, a first field of a first slot 311, a first field of a second slot 312, a VPN 314, a mask 316, a cacheability attribute 318, a PPN 319, a read permission indicator 320, a write permission indicator 321, a user permission indicator 322, and an index number 323 of an entry from a second TLB. The first TLB 108 may also include a second entry ("T1E2" 306) that corresponds to the first thread. In this case, the second entry 306 associated with the first thread may include translation information 335-345. As another example, a second thread may be associated with a first entry ("T2E1" 304) that includes translation information 324-334 and a second entry ("T2E2" 308) that includes translation information 346-356.

The comparators 365-368 may be configured to output a VPN of entries in the first TLB 108 based on a thread selection signal 383. The thread selection signal 383 may indicate whether a particular thread is currently selected by a processor (e.g., the processor 102 of FIG. 1). For example, when the thread selection signal 383 indicates that a first thread is being executed by a processor, an output 387 of the first multiplexer 357 may be the VPN 314 of the first entry 302 of the first thread and an output 388 of the third multiplexer 359 may be the VPN 338 of the second entry 306 of the first thread. Alternatively, when the thread selection signal 383 indicates that a second thread is being executed by a processor, the output 387 of the first multiplexer 357 may be the VPN 327 of the first entry 304 of the second thread and the output 388 of the third multiplexer 359 may be the VPN 349 of the second entry 308 of the second thread. The output 387 of the first multiplexer 357 may be transmitted to the first comparator 365 and the third comparator 367. The output 388 of the third multiplexer 359 may be transmitted to the second comparator 366 and the fourth comparator 368.

Each comparator 365-368 may be configured to compare an entry to a particular slot of an address of the VLIW packet 201. For example, the first comparator 365 may compare an address of a first entry (e.g., VPN 327, 314) of the first TLB 108 to the second address 209 of the second memory instruction 207 of the VLIW packet 201. The second comparator 366 may compare an address of a second entry (e.g., VPN 338, 349) of the first TLB 108 to the second address 209 of the second memory instruction 207 of the VLIW packet 201. The third comparator 367 may compare an address of a first entry (e.g., VPN 327, 314) of the first TLB 108 to the first address 205 of the first memory instruction 203 of the VLIW packet 201. The fourth comparator 368 may compare an address of a second entry (e.g., VPN 338, 349) of the first TLB 108 to the first address 205 of the first memory instruction 205 of the VLIW packet 201.

In response to detecting a match at a particular comparator, an output of the comparator may indicate the match. For example, when the first comparator 365 determines that the output 387 of the first multiplexer 357 matches the second address 209 of the VLIW packet 201, the output 391 of the first comparator 365 may be a logic one. In this case, the second comparator 366 may determine that the output 388 of the third multiplexer 359 does not match the second address 209 and thus the output 392 of the second comparator 366 may be a logic zero. As another example, when the third comparator 367 determines that the output 387 of the first multiplexer 357 matches the first address 205 of the VLIW packet 201, the output 393 of the third comparator 367 may be a logic one. In this case, the fourth comparator 368 may determine that the output 388 of the third multiplexer 359 does not match the first address 205 and thus the output 394 of the fourth comparator 368 may be a logic zero.

The fifth multiplexer 361 may be configured to generate an output 395 that indicates which entry in the first TLB 108 matches the first address 205 based on a first slot indicator 386. The output 395 may be two bits, where the first bit indicates whether the first entry is selected and the second bit indicates whether the second entry is selected. The first slot indicator 386 may include two bits. In the embodiment illustrated in FIG. 3, the first bit of the first slot indicator 386 may correspond to the first field (e.g. 311, 325) of the first slot in the first entry (e.g. 302, 304) and the second bit of the first slot indicator 386 may correspond to the first field (e.g. 336, 347) of the first slot in the second entry (e.g. 306, 308). The first bit may cause the fifth multiplexer 361 to select a logical one value when the first slot of the first entry (e.g. 302, 304) is in use, and to select the output 393 when the first slot of the first entry (e.g. 302, 304) is not in use. The second bit may cause the fifth multiplexer 361 to select a logical one value when the first slot of the second entry (e.g. 306, 308) is in use, and to select the output 394 when the first slot of the second entry (e.g. 306, 308) is not in use.

Similarly, the output 393 and the output 394 form a two bit decoded selection. For example, when the output 393 is a logic zero and the output 394 is a logic one, the second entry (306, 308) may be selected at the seventh multiplexer 363. Alternatively, when the output 393 is a logic one and the output 394 is a logic zero, the first entry (302, 304) may be selected at the seventh multiplexer 363. When neither comparator 367, 368 matches the first address 205 to a VPN in the first entry or the second entry, the two bit decoded selection of the outputs 393, 394 may be "00" and may cause the first TLB 108 to request to retrieve the translation from another TLB (e.g., the second TLB 106). The combination of a "11" two bit decoded selection of the outputs 393, 394 may not occur.

The sixth multiplexer 362 may be configured to generate a two-bit output 396 that indicates which entry in the first TLB 108 matches the second address 209 based on a second slot indicator 385. The output 396 may be two bits, where the first bit indicates whether the first entry is selected and the second bit indicates whether the second entry is selected. The second slot indicator 385 may include a first bit that corresponds to the first field (e.g. 312, 326) of the second slot in the first entry (e.g. 302, 304) and a second bit that correspond to the first field (e.g. 337, 348) of the second slot in the second entry (e.g. 306, 308). The first bit may cause the sixth multiplexer 362 to select a logical one value when the second slot of the first entry (e.g. 302, 304) is in use, and to select the output 391 when the second slot of the first entry (e.g. 302, 304) is not in use. The second bit may cause the sixth multiplexer 362 to select a logical one value when the second slot of the second entry (e.g. 306, 308) is in use, and to select the output 394 when the second slot of the second entry (e.g. 306, 308) is not in use.

Similarly, the output 391 and the output 392 form a two bit decoded selection. For example, when the output 391 is a logic zero and the output 392 is a logic one, the second entry (306, 308) may be selected at the eighth multiplexer 364. Alternatively, when the output 391 is a logic one and the output 392 is a logic zero, the first entry (302, 304) may be selected at the eighth multiplexer 364. When neither comparator 365, 366 matches the second address 209 to a VPN in the first entry or the second entry, the two bit decoded selection of the outputs 391, 392 may be "00" and may cause the first TLB 108 to request to retrieve the translation from another TLB (e.g., the second TLB 106). The combination of a "11" two bit decoded selection of the outputs 391, 392 may not occur.

Alternatively, the first slot indicator 386 and the second slot indicator 385 can be in encoded form and stored outside the entries 302-308. For example, the first bit of the first slot indicator 386 may indicate whether a first slot is in use (i.e., one of the first fields 311, 325, 336, 347 of the first slot) and the second bit of the first slot indicator 386 may indicate which entry (e.g., the first entry (e.g., 302, 304) or the second entry (e.g., 306, 308)) has a first slot that is in use. When the first bit of the first slot indicator 386 indicates that the first slot is in use and the second bit indicates that the first entry 302 has a first slot that is in use, the fifth multiplexer 361 may select a "1" input as the first bit of the output 395. In this case, when the second bit of the first slot indicator 386 indicates that the first slot of the first entry is in use, the output 395 may also indicate to the seventh multiplexer 363 that the first entry is in use. Alternatively, when the second bit of the first slot indicator 386 indicates that the first slot of the second entry is in use, the output 395 may also indicate to the seventh multiplexer 363 that the second entry is in use. For example, the fifth multiplexer 361 may select a "1" input as the second bit of the output 395.

The output 395 of the fifth multiplexer 361 may be used to select an input to the seventh multiplexer 363. The seventh multiplexer 363 may be configured to receive the output 389 of the second multiplexer 358 and the output 390 of the fourth multiplexer 360. The output 389 of the second multiplexer 358 may be the PPN 319, 330 of the first entry for a particular thread. The output 390 of the fourth multiplexer 360 may be the PPN 341, 352 of the second entry for a particular thread. For example, when the output 395 of the fifth multiplexer 361 indicates that the first entry 302 of the first thread is selected, the seventh multiplexer 363 selects the PPN 319 of the first entry 302 of the first thread as an output 397. As another example, when the output 395 of the fifth multiplexer 361 indicates that the second entry 308 of the second thread is selected, the seventh multiplexer 363 selects the PPN 352 of the second entry 308 of the second thread. The seventh multiplexer 363 may be configured to transmit the selected PPN as the output 397 to a pipeline (of the processor 102 of FIG. 1) for further processing.

The output 396 of the sixth multiplexer 362 may be used to select an input to the eighth multiplexer 364. The eighth multiplexer 364 may be configured to receive the output 389 of the second multiplexer 358 and the output 390 of the fourth multiplexer 360. For example, when the output 396 of the sixth multiplexer 362 indicates that the first entry 302 of the first thread is selected, the eighth multiplexer 364 selects the PPN 319 of the first entry 302 of the first thread as an output 398. As another example, when the output 396 of the sixth multiplexer 362 indicates that the second entry 308 of the second thread is selected, the eighth multiplexer 364 selects the PPN 352 of the second entry 308 of the second thread. The eighth multiplexer 364 may be configured to transmit the selected PPN as the output 398 to the pipeline for further processing.

As described in FIG. 1, the first TLB 108 may be configured to synchronize a particular entry with a corresponding entry of another TLB (e.g., the second TLB 106) based on the first field and the second field of the first TLB 108. The first TLB 108 may be configured to set and clear a first field 311, 325, 336, 347 of a first slot responsive to, respectively, the inputs 374, 375, 376, 378. For example, the first field 311 of the first slot of the first entry 302 may be set by a high logic signal at the input 374. The first TLB 108 may be configured to set and clear a first field 312, 326, 337, 348 of the second slots responsive to, respectively, the inputs 379-382. For example, the first field 312 of the second slot of the first entry 302 may be set by a high logic signal at the input 379.

The first TLB 108 may be configured to set and clear a second field 310, 324, 335, 346 responsive to, respectively, the inputs 370-373. For example, when the corresponding entry 110 is copied into the first entry 302, the first TLB 108 may be configured to set the second field 310 by applying a high logic signal at the input 370. As another example, when the entry 110 in the second TLB 106 that corresponds to the first entry 302 is changed, the second field 310 may be cleared by a low logic signal at the input 370.

During operation, when a particular thread begins execution of the first memory instruction 203, the first TLB 108 may determine whether a translation of the first address 205 associated with the first memory instruction 203 is included in an entry of the first TLB 108. The first TLB 108 performs the determination by comparing the first address 205 to the VPNs of the entries. If the first TLB 108 determines that the entries do not include the translation, the translation may be retrieved from the second TLB 106 or the memory 104 of FIG. 1 and loaded into one of the entries of the first TLB 108. For example, as described in FIG. 1, the corresponding entry 110 may be copied from the second TLB 106 into the translation entry 112 in the first TLB 108.

When the comparators 367-368 detect a match between a VPN of an entry and the first memory address 205, the processor 102 of FIG. 1 may set the corresponding first field of the first slot for the particular entry. For example, when the VPN 314 of the first entry matches the first memory address 205, the processor 102 of FIG. 1 sets the first field 311 of the first slot of the first entry 302. The processor 102 of FIG. 1 may also set the second field 310 to indicate that the first entry 302 includes translation information that matches a particular corresponding entry of the second TLB 106.

The outputs 393-394 of the comparators 367-368 may be used to perform the translation of the first memory address 205. For example, when the outputs 393-394 indicate that the VPN 314 matches the first memory address 205, the PPN 319 may be output by the seventh multiplexer 363 to the processor 102 of FIG. 1. In this case, the processor 102 may use the PPN 319 to access an address (e.g., the second address 142) of the memory 104.

If the first memory instruction 203 fails to complete execution, during a replay of the first memory instruction 203, the first TLB 108 may re-perform a translation of the first memory address 205. In this case, the first TLB 108 may determine that the entry that includes the translation information is already identified; thus, a comparison of the first memory address 205 to the VPNs of the first TLB 108 may be skipped. For example, the first TLB 108 may prevent the comparison of the first memory address 205 with an address in the first TLB 108 when the first field 311 of the first slot of the first entry 302 is set.

Preventing the comparison may prevent the first memory address 205 from being compared to the VPNs of the first TLB 108 by preventing reading of the VPNs. For example, the first multiplexer 357 (e.g., an output circuit) may be configured to suppress a read of a virtual address (e.g., VPN) in response to a first field being set. In this case, the first TLB 108 may turn off the comparators 367-368 that are used to perform the comparison of the first memory address 205 to VPNs of the entries. To perform the translation (i.e., generate a particular PPN), the first TLB 108 may use the first slot indicator 386. For example, the first slot indicator 386 may indicate which entry includes the particular PPN that is a translation of the first memory address 205. In this case, the particular PPN may be generated and provided to the processor 102 without the performance of a comparison or a lookup of the translation in the second TLB 106 or the memory 104 of FIG. 1.

Performance of a translation by comparing a memory address to addresses within entries of a TLB may use more power and take a longer time to perform than a translation that uses the slot indicators 385-386. Thus, the processor 102 may reduce power consumption by managing the first TLB 108 based on the first fields and the second fields to selectively skip a comparison of the addresses during execution of the memory instruction.

If during execution of the memory instruction 203, the corresponding entry in the second TLB 106 is updated or changed, an indication of the change may be provided to the first TLB 108. In this case, the first TLB 108 may identify the entry that corresponds to the updated second TLB entry. For example, the first TLB 108 may use the index number 323, which maps the first entry 302 to the corresponding entry in a second TLB, to determine that the first entry 302 corresponds to an entry in the second TLB 106 that has been changed. In this case, the processor 102 of FIG. 1 may clear the second field 310 of the first entry 302.

The first TLB 108 may synchronize the first entry 302 to match the updated corresponding entry in the second TLB 106 based on the first fields 311, 312 and the second field 310. For example, if either of the first fields 311, 312 are set, the first TLB 108 may not change the first entry 302 although the second field 310 indicates that the entry 302 does not match the corresponding entry in the second TLB 106. Thus, a particular entry in the first TLB 108 is not updated, removed, or otherwise changed until both memory instructions 203, 207 of the VLIW packet 201 have completed execution.

By configuring a first TLB 108 to perform changes to a particular translation entry only after both memory instructions 203, 207 have completed execution, the processor 102 may receive a VLIW packet 201 that include instructions (e.g., the first memory instruction 203, the second memory instruction 207) that must complete execution together (e.g., both instructions must complete execution or both must fail execution). For example, the processor 102 of FIG. 1 may prevent one of the first memory instruction and the second memory instruction from completing execution when the other one of the first memory instruction and the second memory instruction does not complete execution. The first memory instruction 203 and the second memory instruction 207 may be architecturally atomic. In this case, because the first TLB 108 may not update an entry until both instructions have completed execution, a particular TLB entry that is being used by an instruction will not change after the other instruction completes execution. Thus, the processor 102 may avoid receiving a miss TLB entry error during the execution of the memory instruction 118.

Figure 4:
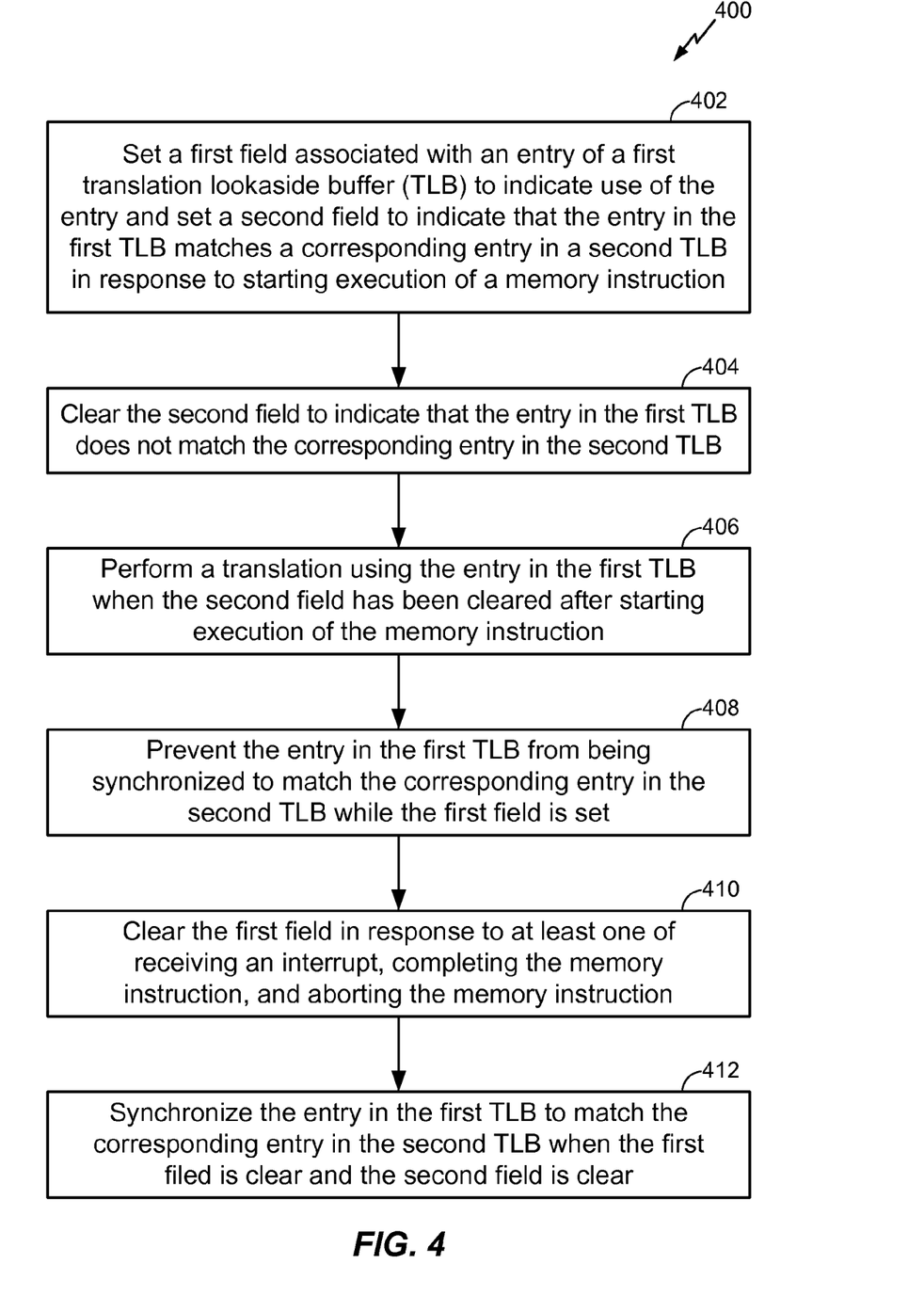
FIG. 4 is a flow chart of a particular illustrative embodiment of a method of managing the first translation lookaside buffer of FIG. 1 based on a first field and a second field.

Referring to FIG. 4, a particular method 400 of managing a translation lookaside buffer (TLB) is shown. The method 400 includes in response to starting execution of a memory instruction, setting a first field associated with an entry of the first TLB to indicate use of the entry and setting a second field to indicate that the entry in the first TLB matches a corresponding entry in a second TLB, at block 402. For example, in response to starting execution of the memory instruction 118, the processor 102 of FIG. 1 sets a first field 114 associated with the translation entry 112 of the first TLB 108 to indicate use of the translation entry 112, and sets the second field 116 to indicate that the translation entry 112 in the first TLB 108 matches the corresponding translation entry 110 in the second TLB 106.

The method 400 also includes clearing the second field to indicate that the entry in the first TLB does not match the corresponding entry in the second TLB, at block 404. For example, in FIG. 1, if the corresponding entry 110 is updated or changed, the processor 102 may inform the first TLB 108 of the change. In this case, the processor 102 of FIG. 1 may be configured to clear the second field 116 of the translation entry 112 to indicate that the translation entry 112 does not match the corresponding entry 110 in the second TLB 106. The method 400 includes performing a translation using the entry in the first TLB when the second field has been cleared after starting execution of the memory instruction, at block 406. For example, in FIG. 1, when the second field 116 is cleared to indicate that the entries 112, 110 do not match, the first TLB 108 may continue to use the translation entry 112 to perform the translation of the first address 140 of the memory instruction 118.

The method 400 also includes preventing the entry in the first TLB from being synchronized to match the corresponding entry in the second TLB while the first field is set, at block 408. For example, the processor 102 of FIG. 1 prevents the translation entry 112 in the first TLB 108 from being synchronized to match the corresponding entry 110 in the second TLB 106 while the first field 114 is set. Preventing synchronization enables the first TLB to continue using the translation entry 112 throughout execution of the memory instruction 118.

The method 400 also includes clearing the first field in response to at least one of receiving an interrupt, completing the execution of the memory instruction, and aborting the memory instruction, at block 410. For example, the processor 102 of FIG. 1 may clear the first field 114 in response to at least one of receiving the interrupt 160, completing the execution of the memory instruction 118, and aborting the memory instruction 118.

The method 400 further includes synchronizing the entry in the first TLB to match the corresponding entry in the second TLB when the first field is clear and the second field is clear, at block 412. For example, the processor 102 of FIG. 1 synchronizes the translation entry 112 in the first TLB 108 to match the corresponding entry 110 in the second TLB 106 when the first field 114 is clear and the second field 116 is clear. When the first field 114 is clear, the memory instruction is no longer using the translation entry 112. In this case, the translation entry 112 is synchronized after the memory instruction 118 has completed execution.

By waiting to synchronize the translation entry 112 until after the memory instruction 118 has completed execution, the same translation information in the translation entry 112 is available to the processor 102 throughout the execution of the memory instruction 118. Thus, the processor 102 may avoid receiving a miss TLB entry error during the execution of the memory instruction 118.

Figure 5:
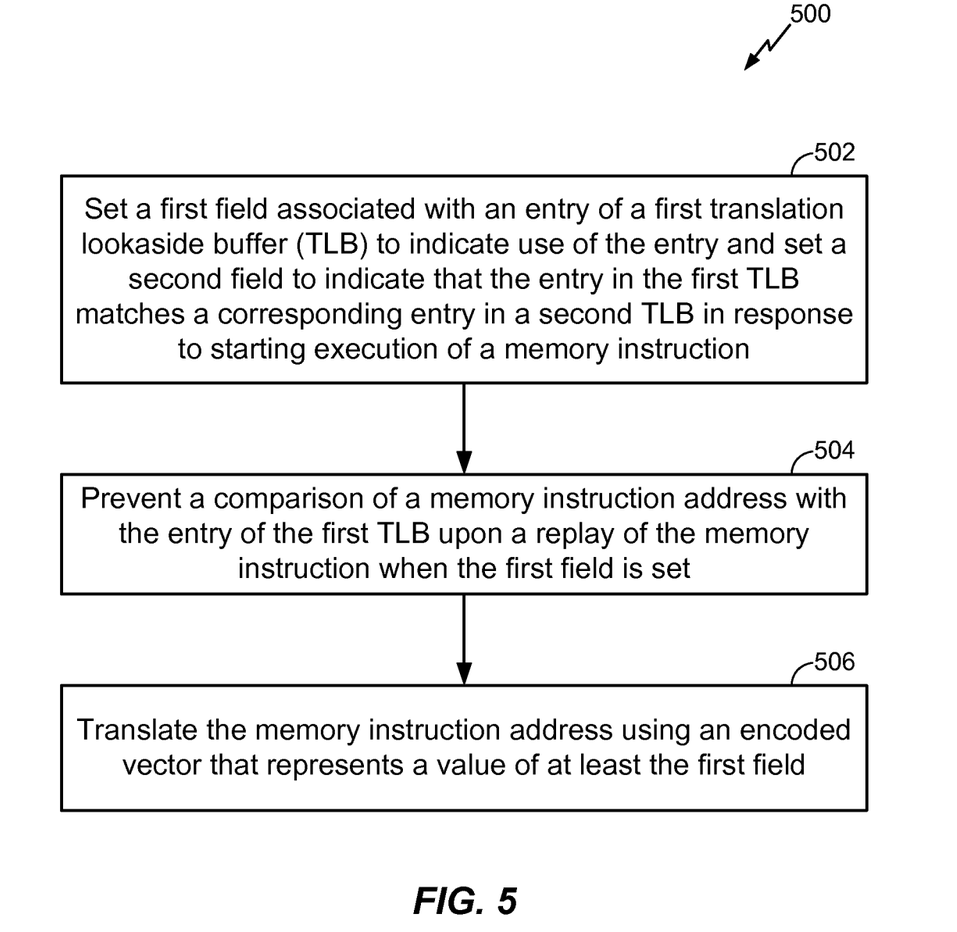
FIG. 5 is a flow chart of a second illustrative embodiment of a method of managing the first translation lookaside buffer of FIG. 1 based on a first field and a second field.

Referring to FIG. 5 a particular method 500 of managing a translation lookaside buffer is shown. The method 500 includes, in response to starting execution of a memory instruction, setting a first field associated with an entry of the first TLB to indicate use of the entry and setting a second field to indicate that the entry in the first TLB matches a corresponding entry in a second TLB, at block 502. The first field may include a plurality of first fields that are associated with the entry in the first TLB. Each first field of the plurality of first fields may indicate whether a particular slot of a very long instruction word (VLIW) packet is using the entry. For example, in FIG. 2, the first slot 260 of the first field 114 may be set to indicate that the first instruction 203 of the VLIW packet 201 is using the translation entry 112 and the second slot 262 of the first field 114 may be set to indicate that the second instruction 207 of the VLIW packet 201 is using the translation entry 112.

The method 500 also includes preventing a comparison of a memory instruction address with the entry of the first TLB upon a replay of the memory instruction when the first field is set, at block 504. Preventing the comparison may include preventing a comparison of the memory instruction address with virtual addresses within the first TLB by preventing reading of a virtual address from the virtual addresses. The method 500 may also include preventing one of the first memory instruction and the second memory instruction from completing execution when the other of the first memory instruction and the second memory instruction does not complete execution. For example, in FIG. 2, when the first slot 260 of the first field 114 is set, the processor 102 of FIG. 1 may prevent 252 the comparison circuitry 240 of FIG. 2 from comparing the first address 203 to the translation entry 112.

The method 500 includes translating the memory instruction address using an encoded vector that represents a value of at least the first field, at block 506. For example, in FIG. 2, when the translation entry 112 is in use, the first TLB 108 may use the encoded vector 250 representing the first field 114 to translate the first address 140.

Performance of a translation by comparing a memory address to addresses within entries of a TLB may use more power and take a longer time to perform than a translation that uses the slot indicators 285-286. Thus, the processor 102 may reduce power consumption by managing the first TLB 108 based on the first fields and the second fields to skip a comparison of the addresses during execution of the memory instruction.

Figure 6:
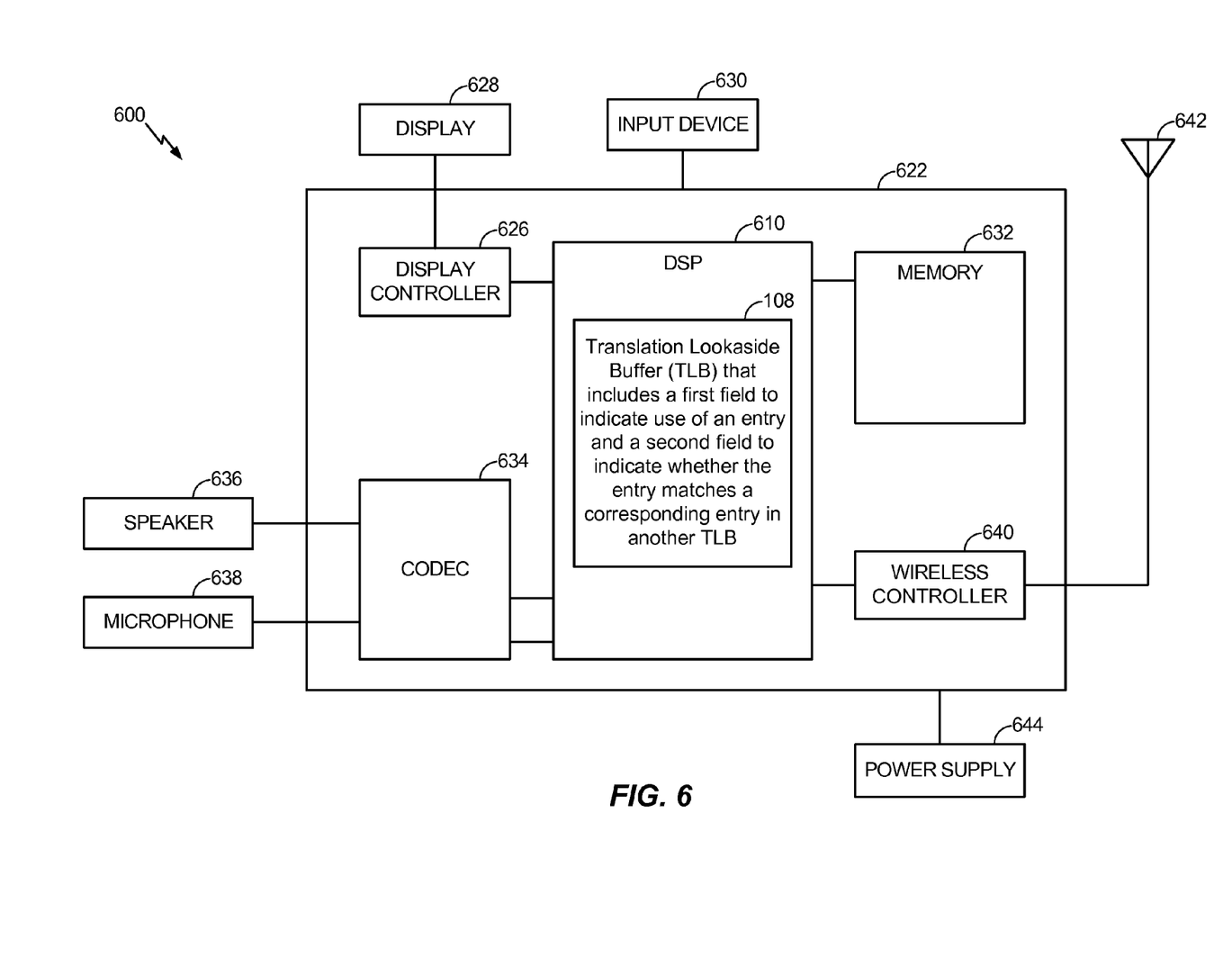
FIG. 6 is a block diagram of a particular embodiment of a wireless communication device that includes the first translation lookaside buffer of FIG. 1.

FIG. 6 is a block diagram of an embodiment of a wireless communication device 600 that includes the translation lookaside buffer (TLB) 108 with a first field and a second field. The first field may indicate whether an entry in the TLB 108 is in use and the second field may indicate whether an entry in the TLB 108 matches a corresponding entry in another TLB (e.g., the second TLB 106 of FIG. 1). The wireless communication device 600 may be implemented as a portable wireless electronic device that includes a processor 610, such as a digital signal processor (DSP), coupled to a memory 632.

In a particular embodiment, a display controller 626 is coupled to the processor 610 and to a display device 628. A coder/decoder (CODEC) 634 can also be coupled to the processor 610. A speaker 636 and a microphone 638 can be coupled to the CODEC 634. A wireless controller 640 can be coupled to the processor 610 and to a wireless antenna 642.

In a particular embodiment, the digital signal processor 610, the display controller 626, the memory 632, the CODEC 634, and the wireless controller 640 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the wireless antenna 642, and the power supply 644 are external to the system-on-chip device 622. However, each of the display device 628, the input device 630, the speaker 636, the microphone 638, the wireless antenna 642, and the power supply 644 can be coupled to a component of the system-on-chip device 622, such as an interface or a controller.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of managing a first translation lookaside buffer (TLB), the method comprising:
in response to starting execution of a memory instruction:
setting a first field associated with a first translation an entry in of the first TLB;
setting a second field associated with the first translation entry to a second field value, the second field value indicating whether the first translation entry in matches a corresponding translation entry in a second TLB; and
clearing the second field value in response to determining that the first translation entry in the first TLB does not match the corresponding translation entry in the second TLB.

2. The method of claim 1, wherein setting the first field comprises setting the first field to a first field value indicating use of the translation entry, wherein the first field maintains the first field value until execution of the memory instruction is completed.

3. The method of claim 2, further comprising preventing the first translation entry in the first TLB from being synchronized to match the corresponding translation entry in the second TLB in response to the first field having the first field value.

4. The method of claim 2, further comprising clearing the first field value in response to at least one of receiving an interrupt, completing the execution of the memory instruction, and aborting the execution of the memory instruction.

5. The method of claim 2, further comprising synchronizing the first translation entry in the first TLB to match the corresponding translation entry in the second TLB conditioned upon the first field value being clear and the second field value being clear.

6. The method of claim 1, wherein the first TLB includes a plurality of slots of the first field that are associated with the first translation entry, wherein each slot of the plurality of slots of the first field is set to a corresponding first field value that indicates whether a corresponding slot of a very long instruction word (VLIW) packet is using the first translation entry, wherein the VLIW packet includes multiple slots.

7. The method of claim 6, wherein a first slot of the VLIW packet includes a first memory instruction and a second slot of the VLIW packet includes a second memory instruction.

8. The method of claim 7, further comprising preventing one of the first memory instruction and the second memory instruction from completing execution in response to the other one of the first memory instruction and the second memory instruction failing to complete execution.

9. The method of claim 6, further comprising preventing synchronization of the first translation entry in the first TLB with the corresponding translation entry in the second TLB in response to a slot of the first field having the first field value.

10. The method of claim 2, further comprising in response to the memory instruction failing to complete during a first execution of the memory instruction, maintaining the first field at the first field value to prevent a comparison of a memory instruction address to the first translation entry during a second execution of the memory instruction, wherein the memory instruction address is associated with the memory instruction.

11. The method of claim 10, wherein preventing the comparison includes preventing a comparison of the memory instruction address with a virtual address within the first translation entry.

12. The method of claim 11, wherein preventing the comparison further includes preventing reading of a virtual address from the first translation entry.

13. The method of claim 10, further comprising translating the memory instruction address using an encoded vector to bypass the comparison.

14. The method of claim 1, further comprising, for a particular translation entry in the second TLB, the particular translation entry in the second TLB having a corresponding particular translation entry in the first TLB, synchronizing the particular translation entry in the first TLB with an updated particular entry in the second TLB conditioned on the first field of the particular translation entry in the first TLB being clear.

15. The method of claim 14, wherein the particular translation entry in the first TLB includes an index number that maps the particular translation entry in the first TLB to the updated particular translation entry in the second TLB.

16. An apparatus comprising:
a first translation lookaside buffer (TLB) comprising:
a first translation entry;
a first field associated with the first translation the first entry;
a second field associated with the first translation entry, wherein the second field indicates whether the first translation entry matches a corresponding translation entry in a second TLB; and
clearing the second field in response to determining that the first translation entry in the first TLB does not match the corresponding translation entry in the second TLB.

17. The apparatus of claim 16, further comprising a processor that executes a memory instruction, wherein the processor includes the first TLB.

18. The apparatus of claim 17, wherein the processor is a multi-threaded processor configured to process a first thread and a second thread.

19. The apparatus of claim 18, wherein the first translation entry corresponds to the first thread and wherein the multi-threaded processor allows the first thread to alter the first translation entry and prevents the second thread from altering the first translation entry.

20. The apparatus of claim 17, wherein the processor is configured to set the first field to a first field value in response to starting execution of the memory instruction, the first field value indicating the first translation entry is in use.

21. The apparatus of claim 20, further comprising a circuit that is configured to suppresses a read of a virtual address within the first translation entry in response to the first field being set to a first field value.

22. The apparatus of claim 20, wherein the processor is configured to prevent the first translation entry in the first TLB from being allocated to another memory instruction until the execution of the memory instruction is complete.

23. The apparatus of claim 20, wherein the processor is configured to re-route a replacement request from the first translation entry to a second translation entry in the first TLB in response to the first field of the first translation entry being set to a first field value.

24. The apparatus of claim 23, wherein the replacement request is re-routed to the second translation entry conditioned upon a first field of the second translation entry being clear.

25. The apparatus of claim 17, wherein the second TLB is a joint TLB.

26. The apparatus of claim 17, wherein the first TLB is a micro-TLB.

27. An apparatus comprising:
means for storing first translation information to enable translation of a first address to a second address;
means for storing a first indicator;
means for storing a second indicator, the second indicator indicating whether the first translation information stored at the means for storing the first translation information matches second translation information stored at a means for storing second translation information; and
means for clearing the second indicator in response to determining that the first translation information in the means for storing first translation information does not match the corresponding translation information stored at a means for storing second translation information.

28. The apparatus of claim 27, wherein the first address is a virtual address and the second address is a physical address in a memory.

29. A non-transitory processor-readable medium having processor executable instructions that, when executed by a processor, cause the processor to:
set a first field associated with a translation entry of a first translation lookaside buffer (TLB);
set a second field associated with the translation entry to a second field value, the second field value indicating whether the translation entry matches a corresponding translation entry in a second TLB; and
clearing the second field in response to determining that the translation entry in the first TLB does not match the corresponding translation entry in the second TLB.

* * * * *

UNITED STATES PATENT AND TRADEMARK OFFICE
CERTIFICATE OF CORRECTION

PATENT NO. : 8,429,378 B2  
APPLICATION NO. : 12/830494  
DATED : April 23, 2013  
INVENTOR(S) : Ajay Anant Ingle, Erich James Plondke and Muhammad T. Rab Page 1 of 1

It is certified that error appears in the above-identified patent and that said Letters Patent is hereby corrected as shown below:

In the Claims

Column 15, line 59, after ";" insert --and--.
Column 15, line 63, "; and" should read --, wherein--.
Column 15, line 64, "clearing the second field" should read --the second field is configured to be cleared--.

Signed and Sealed this
Twenty-ninth Day of July, 2014

Michelle K. Lee
*Deputy Director of the United States Patent and Trademark Office*